(12) United States Patent
Howard et al.

(10) Patent No.: US 6,513,017 B1
(45) Date of Patent: *Jan. 28, 2003

(54) SYSTEM AND METHOD FOR HOUSEHOLD GROCERY MANAGEMENT

(75) Inventors: Dale S. Howard, DesMoines, IA (US); Jennifer R. Messer, Norwalk, IA (US); Gregory J. Delamore, DesMoines, IA (US)

(73) Assignee: Electronic Data Systems Corporation, Plano, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 08/833,229

(22) Filed: Apr. 14, 1997

(51) Int. Cl.[7] .............................................. G06F 17/00
(52) U.S. Cl. ............................................ 705/28; 705/14
(58) Field of Search .............................. 705/14, 28, 22; 707/1, 11; 235/375, 385

(56) References Cited

U.S. PATENT DOCUMENTS

| | | | | |
|---|---|---|---|---|
| 4,563,739 A | * | 1/1986 | Gerpheide et al. | 705/28 |
| 4,797,818 A | * | 1/1989 | Cotter | 705/15 |
| 4,954,954 A | * | 9/1990 | Madsen et al. | 364/413.29 |
| 5,231,566 A | * | 7/1993 | Blutinger et al. | 705/27 |
| 5,483,472 A | * | 1/1996 | Overman | 364/705.06 |
| 5,602,730 A | * | 2/1997 | Coleman et al. | 395/215 |
| 5,646,389 A | * | 7/1997 | Bravman et al. | 235/385 |
| 5,884,281 A | * | 3/1999 | Smith et al. | 705/26 |
| 6,014,634 A | * | 1/2000 | Scroggie et al. | 705/14 |
| 6,088,681 A | * | 7/2000 | Coleman et al. | 705/15 |

FOREIGN PATENT DOCUMENTS

JP 02001258890 A * 9/2001

OTHER PUBLICATIONS

Derwent–Acc–No.: 2001–611415; Hatanaka et al.; Sep. 2001.*

Inventory Management, Chilton's Distribution, V84; Davis Denis et al, Jun. 1985.*

Webb, Margaret "Bringing Home the Bacon—and Bread" The Washington Post v113 n 279 sE p9 retrieved from Dialog file #635, Sep. 12, 1990.*

Port, Otis "Can You Trust Your Toaster?" Business Week p 82 Retrieved from Dialog File #624, Sep. 30, 1996.*

Marsh, Barbara "Peapod's On–line Grocery Service Checks Out Success" Wall Street Journal Thu ed, col 3, p B2 retrieved from Dialog #148, Jun. 30, 1994.*

"Smart Shopping for Busy People", Author: Peapod Web Page.

* cited by examiner

Primary Examiner—James P. Trammell
Assistant Examiner—Pierre E. Elisca
(74) Attorney, Agent, or Firm—Baker Botts LLP; L. Joy Griebenow

(57) ABSTRACT

A system for h household grocery management is provided. The system includes a bar code scanner (22) operable to scan a bar code on a grocery item and to provide bar code data obtained thereby. The system also includes a computer system (20) coupled to receive the bar code data provided by the bar code scanner (22). The computer system (20) has a fixed data storage storing a grocery inventory (26) and a processor executing a grocery management application (24). The grocery management application (24) operates to process the bar code data to identify a scanned grocery item, to maintain the grocery inventory (26), and to generate a replenishment list (32) of grocery items based upon differences between current grocery inventory (26) and defined full levels for the household (10).

9 Claims, 3 Drawing Sheets

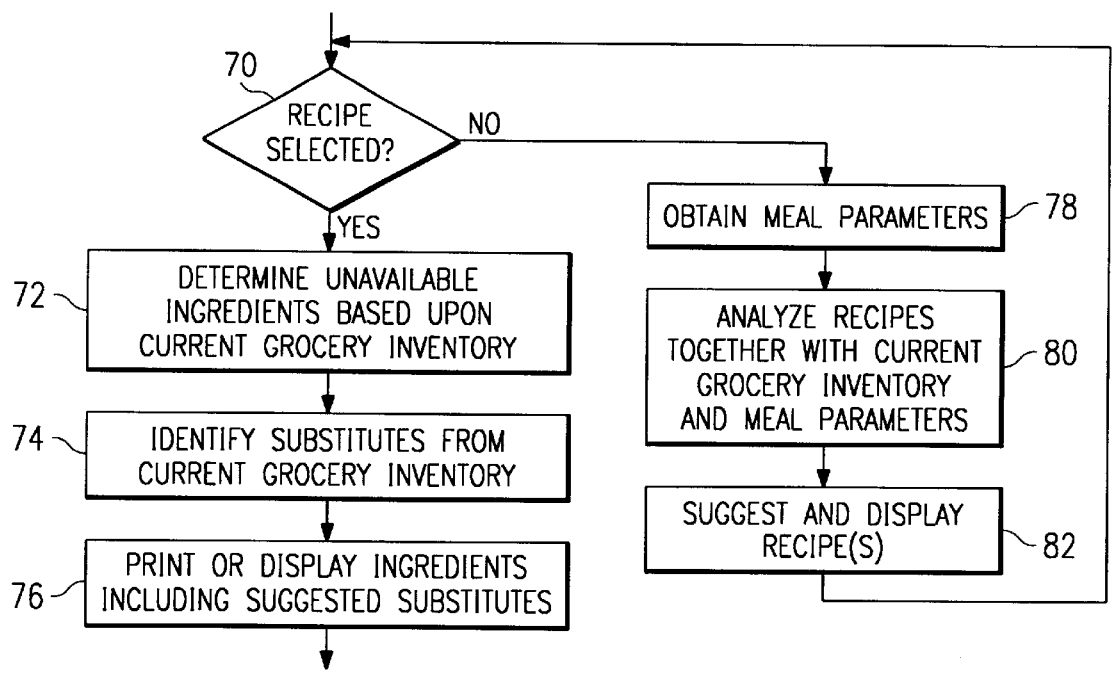
FIG. 4
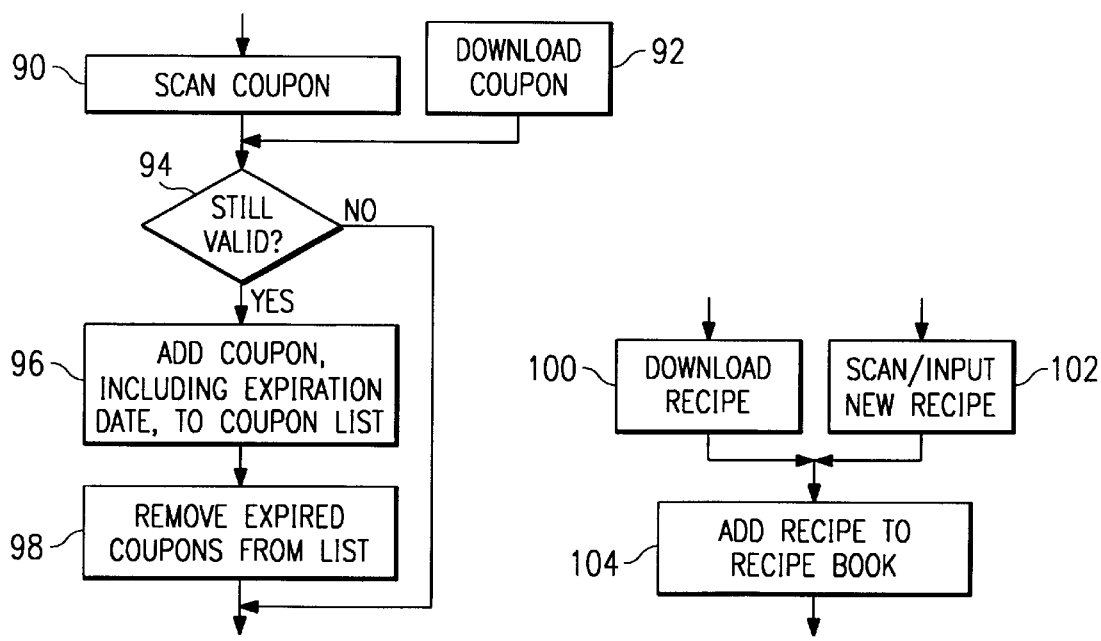
FIG. 5
FIG. 6

SYSTEM AND METHOD FOR HOUSEHOLD GROCERY MANAGEMENT

TECHNICAL FIELD OF THE INVENTION

This invention relates in general to the field of electronic systems, and more particularly to a system and method for household grocery management.

BACKGROUND OF THE INVENTION

With the increase in use of personal computers and other computerized devices in the household, numerous systems have been devised for providing assistance to people in their daily lives. Further, the use of network connections, direct dial connections and the Internet allow people to accomplish tasks electronically from their homes. For example, there are Internet web sites that allow people to perform stock transactions and to purchase consumer goods and services.

Some conventional technologies address the time consuming task of grocery shopping and are designed to allow people to more easily accomplish this task. One Internet web site, operated by PEAPOD, allows people to shop for groceries, select grocery items to purchase, pay for the groceries and have the groceries delivered to their house. As part of the selection process, this web site allows people to view pictures of grocery items and view nutritional information before purchasing. Payment for delivery can be made by a number of methods such as check, charge, bank debit card or electronic payment. Other grocery-related technologies include that displayed in the pavilion operated by ELECTRONIC DATA SYSTEMS CORPORATION at the Infomart in Dallas, Tex. Within the pavilion, there is a mini-mart display that includes a product information kiosk. This kiosk allows a customer to scan a grocery item using its bar code. The kiosk will then display information about the scanned item. For example, the kiosk will provide nutritional information about the item, suggest recipes using the item, and provide a map of where that item is located within the mini-mart.

Despite these and other conventional technologies, it is desirable to provide people with more efficient means for managing groceries within their household.

SUMMARY OF THE INVENTION

In accordance with the present invention, a system and method for household grocery management are shown that provide advantages over conventional grocery related technologies.

According to one aspect of the present invention, a system for household grocery management is provided. The system includes a bar code scanner operable to scan a bar code on a grocery item and to provide bar code data obtained thereby. The system also includes a computer system coupled to receive the bar code data provided by the bar code scanner. The computer system has a fixed data storage storing a grocery inventory and a processor executing a grocery management application. The grocery management application operates to process the bar code data to identify a scanned grocery item, to maintain the grocery inventory, and to generate a replenishment list of grocery items based upon differences between current grocery inventory and defined full levels for the household. The defined full levels will be adjusted for seasonal changes based on the parameters set by the consumer.

A technical advantage of the present invention is the integration of a household grocery inventory, a coupon list, a recipe book and/or replenishment lists in one electronic system for managing groceries within the household. This integration provides important advantages to users by reducing the time it takes to prepare for and accomplish grocery shopping.

Another technical advantage of the present invention is a system that automatically suggests recipes for meals based upon current household grocery inventories. Further, the system can suggest substitutions from the household grocery inventory for ingredients in a selected recipe when the household grocery inventory does not include ingredients specified on the recipe.

A further technical advantage of the present invention is the provision of a grocery clearing house that interfaces between households and grocery stores such that the electronic interface with the consumers is handled centrally by the grocery clearing house.

An additional technical advantage of the present invention, is the ability for the grocery store or grocery clearing house to show the user advertisements, promotions and discounts for particular products as well as provide new recipes to be downloaded that include as ingredients products that are being promoted. This provides advantages to the marketing efforts of the grocery store or grocery clearing house. The grocery store or grocery clearing house can also promote new products based upon purchases indicated in a current replenishment list or past replenishment lists. In addition, seasonal products can be suggested based upon a replenishment list and seasonal products can be suggested in advance of the season of not purchased by the user.

Another technical advantage of the present invention is integration with a budget software. This allows the consumers to keep their grocery purchases within a set amount so that they do not exceed their spending limit.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 4 is a flow chart of one embodiment of integrating a recipe book with a household grocery inventory;

FIG. 5 is a flow chart of one embodiment of maintaining a coupon list for the household of currently valid coupons; and FIG. 6 is a flow chart of one embodiment of adding new recipes to a recipe book.

DETAILED DESCRIPTION OF THE INVENTION

Figure 1:
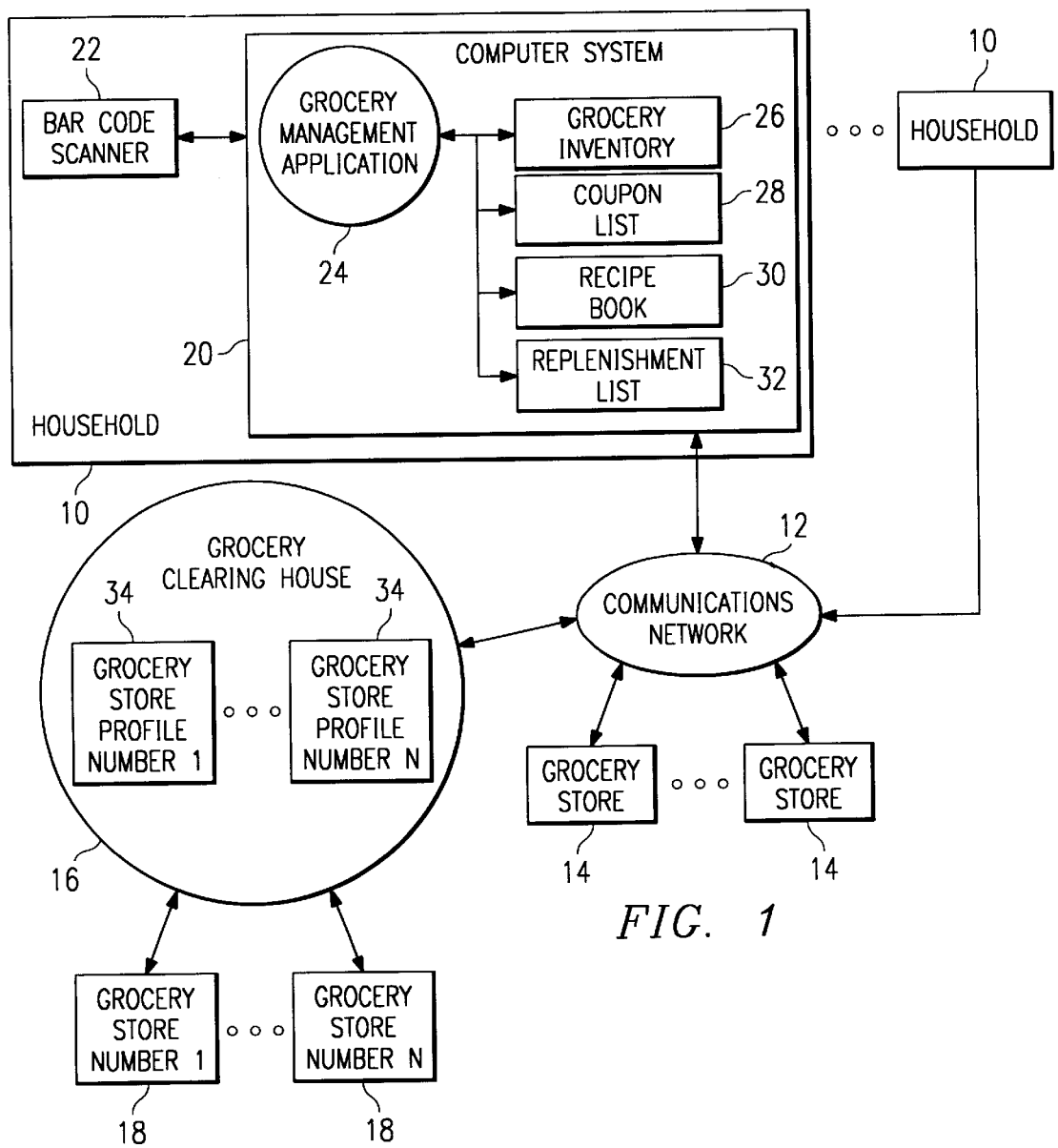
FIG. 1 is a block diagram of one embodiment of a system for household grocery management.

FIG. 1 is a block diagram of one embodiment of a system for household grocery management. As shown in FIG. 1, a plurality of households 10 are connected to a communications network 12. Communications network 12, for example, can be a local area network (LAN), wide area network (WAN), intranet or the Internet supported by the public telephone network, a cable network, a cellular network or a combination thereof. A plurality of grocery stores 14 are also connected to communications network 12. In addition, a grocery clearing house 16 is connected to communications network 12 and to a second plurality of grocery stores 18. Communications network 12 allows households 10 to communicate information with grocery stores 14 and grocery clearing house 16.

Each household 10 in the embodiment of FIG. 1 has a computer system 20 and a bar code scanner 22. Bar code scanner 22 is coupled to and communicates with computer system 20, for example, through a serial interface port. Bar code scanner 22 can be located on or under a kitchen counter top, in a pantry, or in another convenient place within household 10. Further, in other embodiments, multiple bar code scanners can be used to ease the task of scanning grocery items. Computer system 20 can be a personal computer, computer workstation or other home computing device having, for example, a processor, memory, data storage device, modem, keyboard, display and other conventional components. Each computer system 20 executes a grocery management application 24 that performs a number of functions to allow a user to manage groceries within respective household 10. Grocery management application 24 maintains and has access to a grocery inventory 26, a coupon list 28, a recipe book 30, and a replenishment list 32. These items can be stored in memory or in fixed data storage as appropriate. Grocery management application 24 also functions to connect to, and communicate across communications network 12 through, for example, a modem included in computer system 20.

Grocery management application 24 provides a number of advantageous functions to a user of computer system 20. A number of embodiments of such functions are shown in and described with respect to the flow charts of FIGS. 2 through 6. For example, grocery management application 24 allows a user to maintain a current inventory of all grocery items in household 10. This inventory is stored as grocery inventory 26 and reflects information about each grocery item such as name, quantity, and expiration date, if applicable. Grocery inventory 26 also includes a master list associating bar codes with particular products and includes an indication of which grocery items are standard items for household 10 and what quantities of these standard items are considered to provide a "full" inventory for household 10. The inventory information used to build grocery inventory 26 can be entered manually through a user interface to grocery management application 24. However, the information is preferably entered using bar code scanner 22 to scan universal bar codes present on the grocery items.

Bar code scanner 22 can be constructed such that it has an "entry" and "deletion" mode of operation. When in the entry mode, bar code scanner reads the bar code and provides that information to grocery management application 24 along with an indication that the item is to be added to grocery inventory 26. Conversely, when in the delete mode, bar code scanner 22 reads the bar code and provides that information to grocery management application 24 with an indication that the item is to be deleted from grocery inventory 26. As an alternative to bar code scanner 22, a grocery store 14 can electronically communicate a list of items scanned at the cash register to computer system 20. Bar code scanner 22 also allows a user to scan bar codes from coupons. The coupon information is then provided to grocery management application 24 which maintains coupon list 28. Coupon list 28 can include information such as the manufacturer, the amount of discount, and the expiration date of each coupon.

Grocery management application 24 also can allow a user to add or modify recipes within recipe book 30. In general, recipe book 30 holds one or more recipes that each define a list of ingredients and steps for preparing a meal. New recipes for recipe book 30 can be entered manually, can be obtained through the fixed storage device, such as from a CD-ROM, or can be downloaded across communications network 12.

Grocery management application 24 further allows a user to build replenishment lists 32 that list grocery items that the user needs to purchase. Grocery management application 24 is able to process grocery inventory 26 together with recipes selected from recipe book 30 to generate a list of products needed to fill inventory and needed to make a selected recipe. Once a replenishment list 32 is generated, grocery management 24 can send that replenishment list 32 across communications network 12 to grocery stores 14 or to grocery clearing house 16. In response, grocery stores 14 and grocery clearing house 16 electronically receive and process replenishment list 32.

Grocery stores 14, process a received replenishment list 32, fill the requested grocery items and either delivery those items or package the items for pick-up. The communication between grocery management application 24 and grocery stores 14 can be accomplished as an on-line transaction or through electronic mail messages. Payments from household 10 to a grocery store 14 can be accomplished electronically across communications network 12 or can be handled at the time of delivery or pick-up.

Grocery clearing house 16 provides a service to grocery stores 18 by handling the electronic interface with households 10 so that grocery stores 18 do not have to implement computer systems to handle communication with households 10. Grocery clearing house 16 maintains a plurality of grocery store profiles 34 with one grocery store profile 34 for each grocery store 18 serviced by grocery clearing house 16. Each grocery store profile 34 includes information defining the associated grocery store 18 such as grocery item inventory, price, delivery methods, and payment terms. In other implementations, grocery store profiles 34 can include other combinations of this information as well as additional types of information. Grocery clearing house 16 can also maintain promotional information such as coupons and suggested recipes associated with each grocery store 18. Once grocery clearing house 16 has completed a transaction with a household 10, grocery clearing house 16 forwards the order to an appropriate grocery store 18. This order forwarding can be accomplished through various methods as is suitable for grocery store 18. These methods can include telephone contact, fax, or electronic connection to existing grocery store computer systems. In this manner, grocery clearing house 16 provides significant advantages for grocery stores 18 in managing orders from households 10. Grocery clearing house 16 could also provide services for a group of grocery stores related through one grocery store profile 34. In this situation, grocery clearing house 16 could receive a replenishment list from a household 10 and fill the order by distributing items across the group of grocery stores. These groups of grocery stores can comprise groups of related stores selling similar items or groups of separate stores selling different items.

Figure 2:
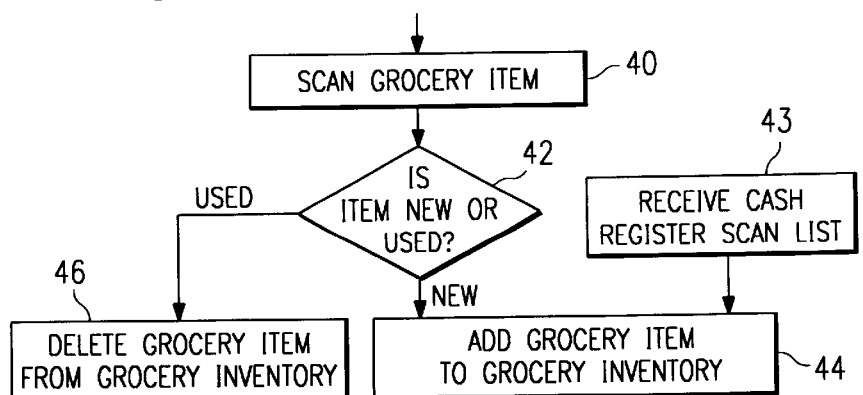
FIG. 2 is a flow chart of one embodiment of maintaining grocery inventory to reflect current stocks of grocery items in the household.

FIG. 2 is a flow chart of one embodiment of maintaining grocery inventory to reflect current stocks of grocery items in a household. In step 40, a grocery item is scanned using a bar code scanner or other scanning means. This scanning of a grocery item reads the bar code on the grocery item. In order to identify the scanned item, the grocery management application cross references the bar code with the master list of bar codes and associated item descriptions. After the item is scanned a determination is made, in step 42, whether or not the scanned item is a new item or a used item. A new item is one that is new to the household inventory and needs to be added to the grocery inventory. A used item is one that has been consumed in the household and needs to be removed from the grocery inventory. Thus, if the scanned item is new, the item is added to the grocery inventory in step 44. Conversely, in step 46, the item is deleted from the grocery inventory if the item is used.

As an alternative, in step 43, the list of items scanned at the grocery store cash register can be electrically communicated to and received by the grocery management application. This communication can include a transfer of a data file either across telephone lines or via a magnetic disk. Following receipt of the list, the items are added to grocery inventory in step 44.

In this manner, the grocery inventory reflects the current household stocks of grocery items at any point in time. It is also possible for the user to be allowed to scan an item as being used even though the item is only partially used. For example, a tub of butter may not be completely used, but the user may know that the item needs to be replaced because of its low level.

Figure 3:
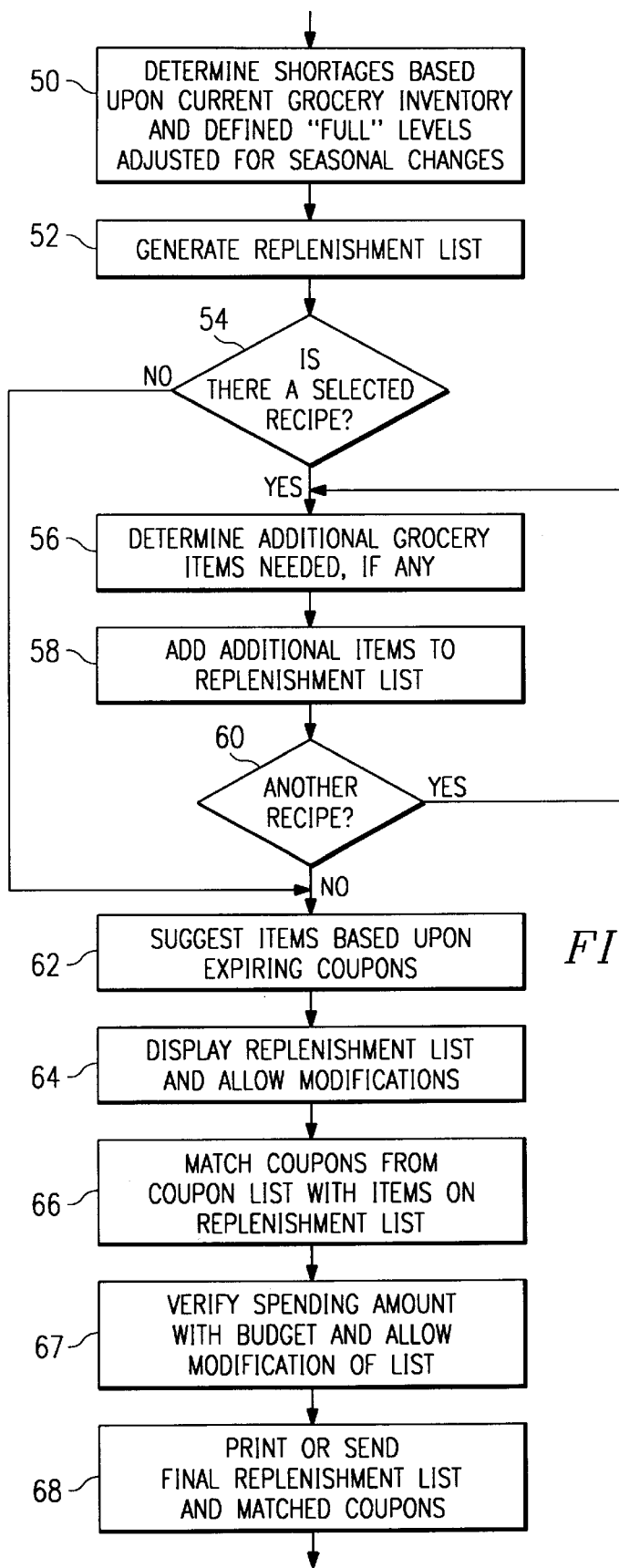
FIG. 3 is a flow chart of one embodiment of generating replenishment lists for purchasing new grocery items.

FIG. 3 is a flow chart of one embodiment of generating replenishment lists for purchasing new grocery items. The embodiment of FIG. 3 integrates the grocery inventory, the coupon list, and the recipe book. In step 50, a determination is made concerning shortages in the household based upon the current grocery inventory and the defined "full" levels which reflects adjustments for seasonal items based on parameters set by the consumer. For example, in the spring, the hot cocoa should decrease and ice tea increase. The shortage determination involves identifying the differences between the full levels, plus or minus adjustments for seasonal items, and the current inventory and noting where there are shortages. In step 52, a replenishment list is generated based upon the shortages determined in step 50. The replenishment list can include the name of the item and the quantity needed to return to full levels. In step 54, a determination is made whether or not the user has selected a particular recipe. If not, the process continues at step 62. If there is a selected recipe, a determination is made, in step 56, whether or not additional grocery items are needed. Additional grocery items are needed if the current grocery inventory combined with the items on the current replenishment list does not fulfill those items needed as ingredients for the selected recipe. In step 58, additional items are added to the replenishment list, if there are any needed. Then, in step 60, a determination is made whether there is another selected recipe. If so, steps 56 and 58 are repeated for each recipe. If not, the process continues at step 62.

In step 62, the coupon list is analyzed to determine whether there are expiring coupons for items not currently on the replenishment list. If so, the corresponding grocery items are suggested to be added to the replenishment list based upon the expiring coupons. Then, in step 64, the current replenishment list is displayed and modifications are allowed. The user may modify the replenishment list to add the items suggested in step 62, add other items, or delete items as desired. In step 66, coupons are matched from the coupon list with the items on the replenishment list. The process can be integrated with budget software. In this case, in step 67, the cost of the replenishment list is verified against the budget and further modifications are allowed.

In step 68, the replenishment list is then printed or sent electronically along with the list of matched coupons. If the replenishment list is printed, the user can then take that list to a grocery store to purchase the desired items. If the replenishment list is sent electronically to a grocery store or the grocery clearing house, the list is processed and items are prepared for pick-up or delivery as appropriate. The electronic communication can include, for example, connecting to an appropriate Internet web page and submitting the replenishment list and matched coupons to a server operated by a grocery store or the grocery clearing house. Further, using this connection, the grocery store or grocery clearing house can show the user advertisements, promotions and discounts for particular products as well as provide new recipes to be downloaded that include as ingredients products that are being promoted. This provides advantages to the marketing efforts of the grocery store or grocery clearing house. The grocery store or grocery clearing house can also promote new products based upon purchases indicated in a current replenishment list or past replenishment lists. In addition, seasonal products can be suggested based upon the replenishment list and seasonal products can be suggested in advance of the season of not purchased by the user.

FIG. 4 is a flow chart of one embodiment of integrating a recipe book with the grocery inventory. In step 70, it is determined whether the user has selected a recipe. If so, a determination of unavailable ingredients based upon the current grocery inventory is made. If there are unavailable ingredients, in step 74, substitutes are identified from the current grocery inventory. Then, in step 76, the ingredients, including any suggested substitutes, are printed or displayed to the user. The user can then use the recipe to make the desired meal and know which ingredients and which substitutes can be used.

If a particular recipe was not selected in step 70, meal parameters can be obtained from the user in step 78. These meal parameters can include a general description of the type of meal desired, the number of people to be served, and other meal information. In step 80, the recipes in the recipe book are analyzed together with the current grocery inventory and the meal parameters and one or more appropriate recipes are determined. In step 82, the suggested recipe or recipes are displayed to the user. The process then returns to step 70 to determine whether or not the user has selected a specific recipe.

FIG. 5 is a flow chart of one embodiment of a method for maintaining a coupon list for the household of currently valid coupons. In step 90, a coupon is scanned by the user. Alternatively, in step 92, a coupon is downloaded from a grocery store or the grocery clearing house. Coupons downloaded in this manner are presented by the grocery store or grocery clearing house as advertisements, promotions or discounts for certain products. In step 94, the scanned or downloaded coupon is analyzed to determine whether or not it is still valid. If the coupon is not valid, the process is completed without adding the coupon to the coupon list. If the scanned or downloaded coupon is valid, the coupon is added to the coupon list in step 96. The information described in the coupon can include the manufacturer, the product name and the expiration date. In step 98, expired coupons are removed from the coupon list to ensure that no expired coupons are included in generating the replenishment lists as discussed above. It should be understood that this removal of expired coupons can be performed automatically within the coupon list with or without the addition of newly scanned or downloaded coupons.

FIG. 6 is a flow chart of one embodiment of a method for adding new recipes to the recipe book. In step 100, a recipe is downloaded from a grocery store or the grocery clearing house. A recipe downloaded in this manner can be provided as a service to customers or can include ingredients that are being promoted by the grocery store or grocery clearing house. Alternatively, in step 102, a new recipe is scanned or input directly to the system by the user. Scanning a recipe can include running the recipe through an optional character recognition device to electronically store the recipe. Input can also be from a removable storage device such as a CD-ROM or disk. Once the new recipe is input, the new recipe is added to the recipe book in step 104. Each recipe can include a list of ingredients that are cross referenced to the bar codes of grocery items that will work as an ingredient. The recipes also include, as is common, a description of how to combine and cook the ingredients to create the meal.

The grocery management application of the present invention allows the user to use a bar code scanner to input information about grocery items and coupon lists. The user can also input information about recipes directly into the system. The grocery management application can integrate combinations of a current grocery inventory, coupon lists, a recipe book, replenishment lists and other grocery-related information to allow a user to manage household groceries. This provides the user with an efficient means for generating replenishment lists and helps to prevent items from being forgotten. This also helps to save money is saved with coupons and based upon advertised sales whenever possible. Further, the grocery clearing house provides advantages to grocery stores by interfacing to households and removing the requirement for grocery stores to implement new systems to handle the electronic information.

Although the present invention has been described in detail, it should be understood that various changes, substitutions and alterations can be made hereto without departing from the spirit and scope of the invention as defined by the appended claims.

What is claimed is:

1. A method for household grocery management, comprising:

maintaining a current grocery inventory for a household using a bar code scanner to scan new and used grocery items;

comparing the current grocery inventory to a list of desired groceries;

determining shortages based upon comparing the current grocery inventory to the list of desired groceries;

generating a replenishment list in response to the determined shortages;

sending the replenishment list to a grocery clearing house across a communications network, the grocery clearing house servicing a plurality of grocery stores;

storing a plurality of recipes which each include at least one ingredient; and receiving a request to initiate automatic meal analysis, wherein the meal analysis includes the steps of:

comparing the grocery inventory to the ingredients of the stored recipes;

suggesting meals in response to the comparing step, wherein the suggested meals are based on selected said recipes;

identifying ingredients from the selected recipes which are absent from the grocery inventory; and adding the absent ingredients to the replenishment list.

2. The method of claim 1, and further comprising sending the replenishment list to a particular grocery store in response to comparing the replenishment list to a plurality of grocery store profiles maintained by the grocery clearing house.

3. The method of claim 1, and further comprising storing consumer preferences configurable by a user, the replenishment list being generated further in response to the consumer preferences.

4. The method of claim 1, and further comprising receiving a data file generated by a grocery store cash register, the data file including a list of grocery items to be added to the current grocery inventory.

5. The method of claim 1, and further comprising storing a list of coupons, the replenishment list being generated further in response to comparing the list of coupons to the current grocery inventory.

6. The method of claim 1, and further comprising storing a list of coupons, each coupon from the list of coupons having an associated expiration date, the replenishment list being generated further in response to comparing the list of coupons, the expiration date associated with each coupon from the list of coupons, and the current grocery inventory.

7. The method of claim 1, and further comprising generating a grocery budget, the replenishment list being generated further in response to the grocery budget.

8. The method of claim 1, further comprising the step of deciding which of the grocery stores will supply the grocery items on the replenishment list, the deciding step being carried out by the grocery clearing house.

9. The method of claim 1, further comprising the step of selecting a subset of the suggested meals generated by the automatic meal analysis, and wherein the adding step is carried out by adding to the replenishment list only the absent ingredients of the recipes corresponding to the meals in the subset.

* * * * *